March 21, 1967 S. BYLSMA ETAL 3,310,314
LAWN SPREADER
Filed Dec. 3, 1964 2 Sheets-Sheet 1
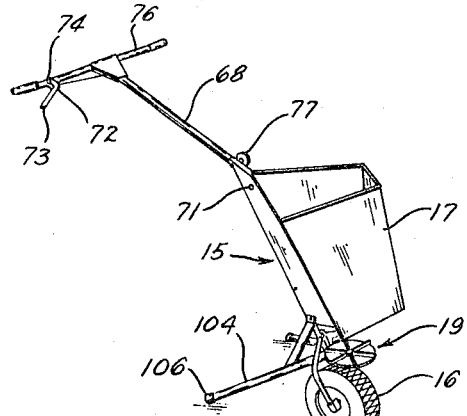
Fig. 1
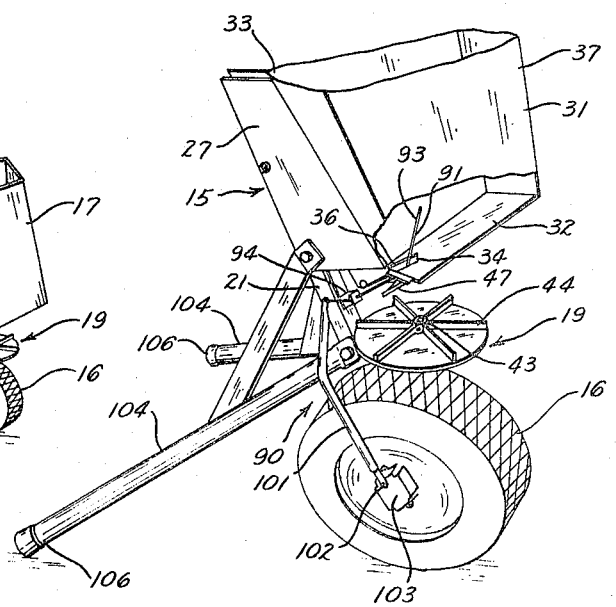
Fig. 2
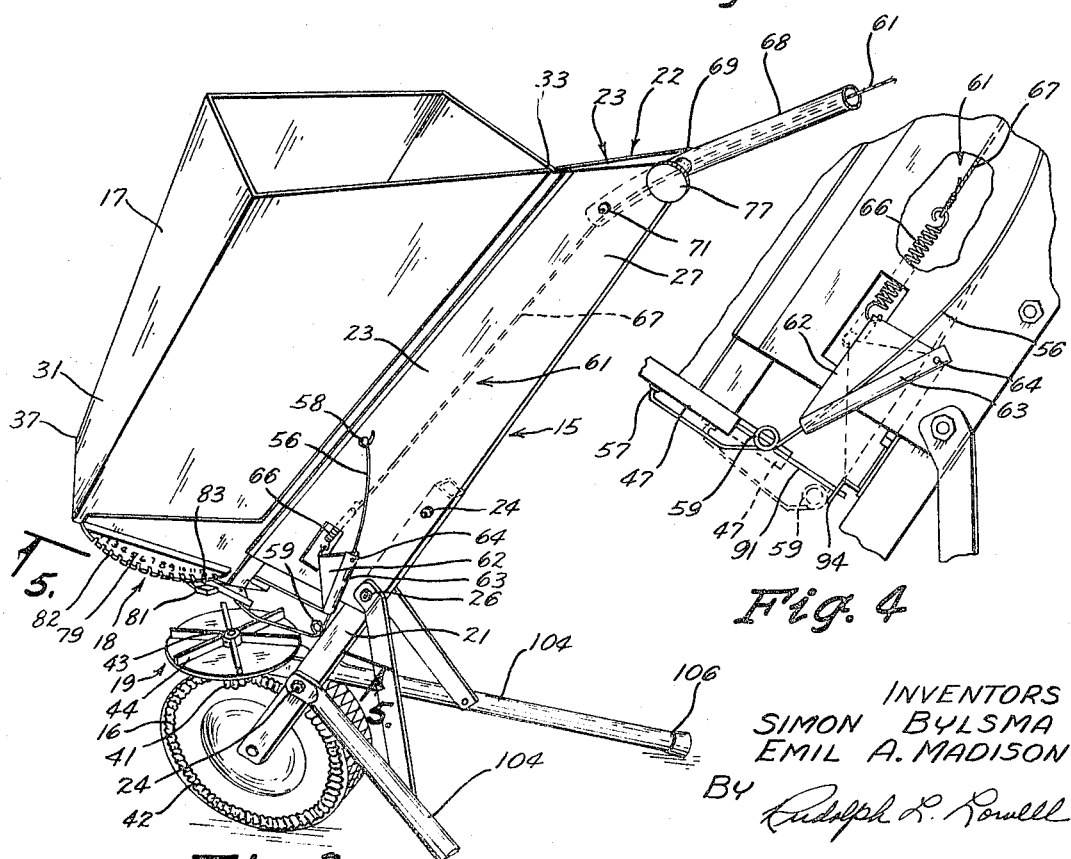
Fig. 3
Fig. 4
INVENTORS
SIMON BYLSMA
EMIL A. MADISON
BY
Rudolph L. Rowell
ATTORNEY

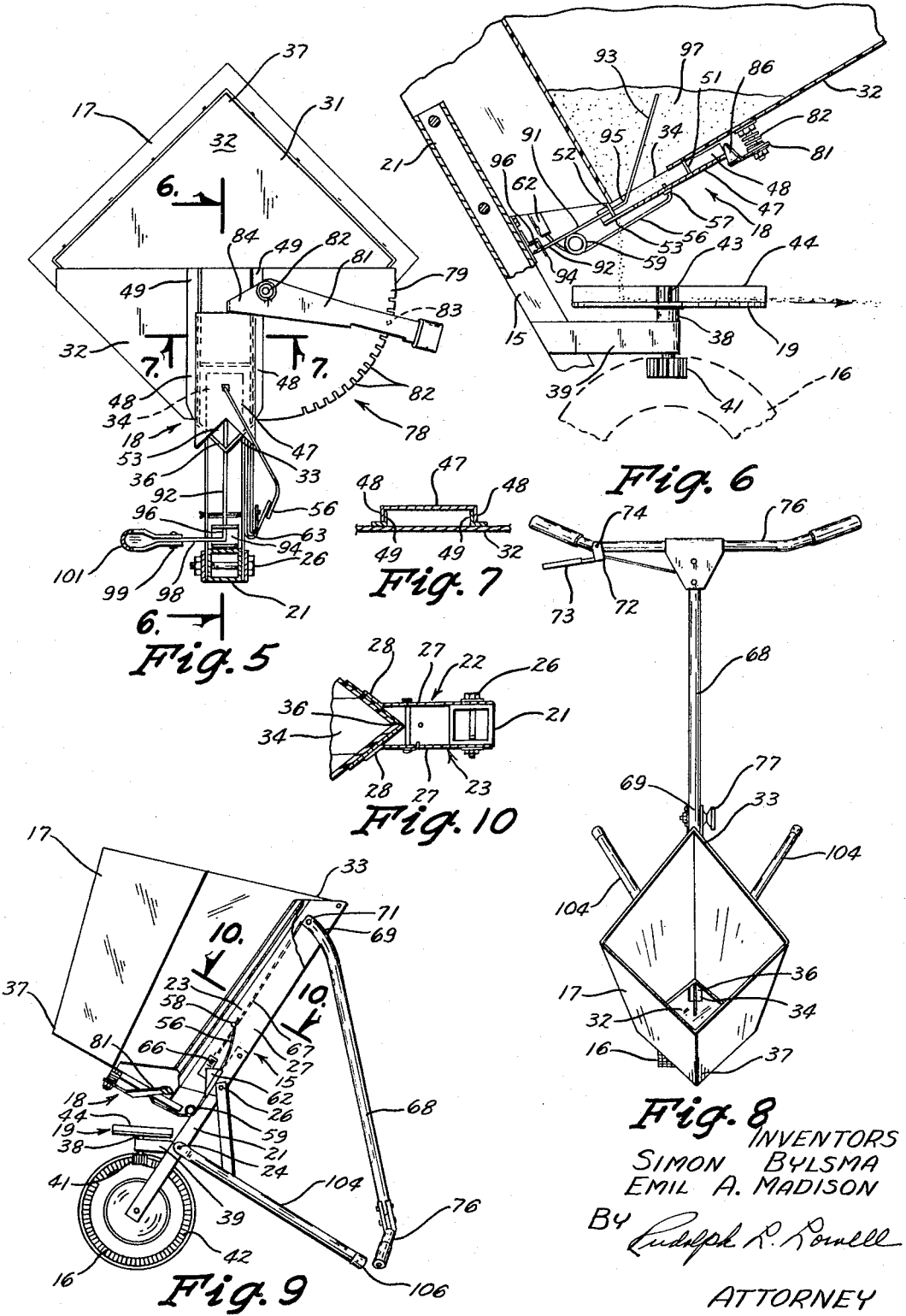

United States Patent Office 3,310,314
Patented Mar. 21, 1967

3,310,314
LAWN SPREADER
Simon Bylsma and Emil A. Madison, Sac City, Iowa, assignors to Remcor Inc., Sac City, Iowa, a corporation of Iowa
Filed Dec. 3, 1964, Ser. No. 415,598
5 Claims. (Cl. 275—15)

This invention relates generally to broadcast spreaders and in particular to a lawn spreader for distributing seed and fertilizer.

An object of this invention is to provide an improved material spreader for lawns.

A further object is to provide a material spreader wherein a hopper with a discharge opening has an agitating mechanism located within and to opposite sides of the discharge opening to maintain a continuous flow of material through the opening.

Still another object is to provide a material spreader having a reciprocally movable valve member for controlling the rate of flow of the material to be spread wherein a spring means for biasing the valve member in one direction constitutes part of an actuating mechanism for moving the valve member in an opposite direction.

Another object of this invention is to provide a material spreader wherein a valve member for controlling the rate of flow of material through a control opening is moved in one direction to a closed position by a biasing means and is movable in an opposite direction into abutting engagement with an adjustable stop by an actuating mechanism which includes the biasing means.

Still another object of this invention is to provide a lawn spreader wherein an upright frame is supported on a single traction wheel which operates a spreader disc and material agitating mechanism that are operatively associated with a frame-mounted upright material hopper.

Still another object of this invention is to provide a lawn spreader which is of a light weight, compact in size for transport and storage purposes and efficient in operation to uniformly spread material at a predetermined rate of flow.

Further objects, features and advantages of this invention will become apparent from the following description when considered in connection with the accompanying drawing in which:

FIG. 1 is a perspective view of the spreader of this invention;

FIG. 2 is an enlarged perspective view of the lower portion of the spreader with a section of the hopper removed to more clearly show the spreader disc and material agitating mechanism;

FIG. 3 is an enlarged perspective view of the spreader showing the actuating mechanism for the valve unit which controls the rate of flow of material to the spreader disc;

FIG. 4 is an enlarged detail view of the agitating mechanism shown in FIG. 3;

FIG. 5 is an enlarged sectional detail view taken substantially along theh line 5—5 in FIG. 3;

FIG. 6 is a sectional view as seen on the line 6—6 in FIG. 5;

FIG. 7 is a sectional detail view taken on line 7—7 in FIG. 5;

FIG. 8 is a perspective view of the spreader looking down into the hopper thereof;

FIG. 9 is a side elevational view of the spreader with the handle thereof shown in the transport or storage position; and FIG. 10 is an enlarged sectional detail view on the line 10—10 of FIG. 9.

With reference to the drawing the spreader of this invention is shown in FIGS. 1 and 3 as including a portable frame unit 15 carried on a single traction wheel 16, and an upright hopper 17 mounted on the frame unit in operative association with a material control mechanism 18 and a spreader disc 19.

The frame unit 15 (FIGS. 2 and 3) has a lower section comprised of an upright tubular frame member 21 and an upper section including a pair of side members 22 and 23 arranged in a laterally spaced parallel relation and secured to opposite sides of the frame member 21 by bolt assemblies 24 and 26. Each side member 22 and 23 is formed from a flat material so as to have a flat body member 27 with the opposite side edges thereof inclined inwardly and upwardly toward each other and a top edge inclined upwardly and rearwardly. As best appears in FIG. 9 the forward edges of the body members 27 terminate in forwardly and outwardly inclined lateral flanges 28 to form an included angle therebetween.

An upright material hopper 31 (FIGS. 2 and 3) of a generally rectangular shape in transverse section has a bottom wall 32 and side walls inclined upwardly and outwardly from the bottom wall to facilitate the travel of material downwardly toward the bottom wall. A corner portion 33 of the hopper 31, hereinafter referred to as the rear corner of the hopper, forms an angle corresponding substantially to the included angle formed by the forward flanges 28 on the upper section of the frame 15 so as to be received in a nesting relation between such flanges for securement thereto as by a weld.

The bottom wall 32 (FIG. 2) lies in a plane substantially normal to the longitudinal axis of the frame unit 15 so that when the frame unit is inclined upwardly and rearwardly in the operation of the spreader, the bottom wall is inclined upwardly and forwardly from the rear corner 33. A material discharge opening is provided in the bottom wall 32 within the rear corner 33 so that the rear end 36 of the opening 34 (FIG. 8) is of an angle shape corresponding in size to the angle of the rear corner 33. The remaining portion of the opening 34 is of a substantially rectangular shape extended diagonally toward the front corner 37 of the hopper 31.

The spreader disc 19 (FIGS. 6 and 8) is located below the discharge opening 34 for rotation about an upright axis and includes a downwardly projected shaft 38 rotatably mounted in a support arm 39 secured to and extended forwardly from the tubular frame member 21. The lower end of the shaft 38 carries a gear 41 which is in meshing engagement with a ring gear 42 integral with the traction wheel 16. The upper side of the disc is formed with a central hub 43 (FIGS. 3 and 6) from which radially extend upright distributing blades or vanes 44.

The rate of flow of material from the discharge opening 34 to the upper side of the disc 19 is controlled by the valve mechanism 18 (FIGS. 5 and 6) which includes a valve member 47 of a U-shape in transverse section (FIG. 7) having a flat elongated body member 47 and legs 48 extended laterally from one side thereof. Secured to the lower side of the hopper bottom wall 32 (FIGS. 5 and 7) is a pair of spaced guide members 49 arranged to opposite sides of a diagonal extended between the front and rear corners 37 and 33 of the hopper 31. These guide members 49 are connected together by a pair of transverse brace members 51 and 52 (FIG. 6) with the member 51 positioned forwardly of the discharge opening 34 and the member 52 positioned at the rear end of the opening 34. The legs 48 of the valve control member 47 are spaced a distance apart greater than the space between the guide members 49 so as to receive the guide members therebetween in slidable contact engagement to provide for a linear movement of the valve member 47 longitudinally of the discharge opening 34 in a spaced parallel relation with the lower side of the hopper bottom wall 32.

The valve member 47 (FIG. 5) at the end thereof adjacent the rear corner 33 is formed with a V-shape notch having an angle corresponding in size to the angle end 36 of the discharge opening 34 and arranged in an opposing relation therewith. It is thus seen that the notch 53 in the valve member 47 in conjunction with the brace member 52 constitutes a control opening adjustable as to size in response to linear movement of the valve member 47 whereby to regulate the rate of flow of material from the discharge opening 34 to the spreader disc 19.

The valve member 47 is held in guidable engagement with the guide members 49 by a spring wire member 56 (FIGS. 3 and 4) of an irregular shape. One end 57 of the wire member 56 is connected to the under side of the valve body member 47 intermediate the ends of the valve body member, and its opposite end is secured to the side member 23 of the frame unit 15 at a forward position thereon spaced upwardly from the valve mechanism 18. The wire 56 is of a length substantially greater than the linear distance between its connected ends 57 and 58 so that the portion between such ends is convexly bowed in a downward and rearward direction. As a result the wire member 56 applies an upwardly and rearwardly directed force on the valve member 47 to yieldably maintain the valve member in guidable engagement with the guide members 49 and to continuously bias the valve member in a rearward direction to close the control opening 53. This spring action of the wire member 56 is complemented by the provision of a spring coil or loop 59 integrally formed intermediate its ends.

The valve member 47 is movable toward a position to open the control opening 53, in opposition to the spring action of the wire member 56, by an actuating mechanism indicated generally as 61 in FIGS. 3 and 4 and which mechanism includes the wire member 56. Located between the loop 59 and end 58 of the wire member 56 is a pivot plate 62 of a generally triangular shape having a wire engaging portion 63 of a trough-shape extended along the hypotenuse side thereof. The plate 62 is pivotally secured to the side member 23 of the frame unit 15 by pivot means 64 at one end of the trough portion 63 which is adapted to receive a portion of the wire 56 therein when the valve member 47 is in its closed position.

The apex portion of the pivot plate 62, opposite the trough or wire engaging portion 63, is connected to one end of a coil spring 66 that is located in the space between the side members 22 and 23 of the frame unit 15. The other end of the spring 66 is connected to a flexible member 67 extended upwardly between the side members 22 and 23 and into a tubular handle member 68 which has an inner end section 69 positioned between the side members 22 and 23 for pivotal support on a pivot pin 71 carried in the side members. The flexible member 61 is trained over the pivot pin 71 and is extended through the full length of the handle 68 for connection of its end 72 to an actuating lever 73 (FIGS. 1 and 8) which is pivotally supported at 74 to a handle bar 76 extended transversely of and secured to the rear end of the handle 68.

The handle 68 is locked against pivotal movement relative to the pivot pin 71 by a locking screw 77 insertable through the side members 22 and 23 of the frame unit 15 and through the inner end section 69 of the handle 68 at a position spaced upwardly and rearwardly from the pivot pin 71. As best appears in FIGS. 1 and 3 the handle 68 in its locked position is extended upwardly and rearwardly from the frame unit 15. On actuation of the lever 73 in a direction toward and against the handle bar 76 the flexible element 61 is moved upwardly and through the spring 66 to pivot the plate member 62 in an upward and forward direction whereby to increase the curvature of the wire member 56, namely, acts to straighten out the bowed curvature of the wire member. As a result of this increase in the curvature of the bowed portion of the wire 56 the valve member 47 is moved forwardly, against the spring action of the wire 56, in a direction providing for the opening of the control port 53 to a predetermined position.

A predetermined position of the valve 47, which in turn controls the size of the control opening 53, is accomplished by the provision of an adjusting means indicated generally at 78 in FIG. 5 and which includes an arcuate segment or quadrant 79 extended laterally from one side of the hopper 31 and formed integral with the bottom wall 32. An adjustable lever 81 (FIGS. 5 and 6) is extended radially of the quadrant 79 and is yieldably supported from the lower side of the bottom wall 32 for pivotal movement relative to the periphery of the segment 79 by a spring and bolt connection indicated generally at 82. The peripheral portion of the quadrant 79 is formed with calibrated slots 82 for selective engagement with a locking pin 83 projected upwardly from the top side of the lever 81, as best shown in FIG. 3. Referring to FIG. 5 the lever 81 has a portion 84 projected into the path of linear travel of the control valve 47 which terminates in an upturned lip or stop member 86 for abutting engagement with the front end of the valve member 47 remote from the control opening or port 53.

Thus on depression of the lever 81 against the action of the spring and bolt assembly 82 the pin 83 is disengaged from a notch 82 and the lever 81 is pivotally movable relative to the quadrant 79 for location of the pin 83 in a desired notch 82. This pivoted adjustment of the lever 81 in turn adjusts the stop 86 to control the linear travel of the control valve member 47 in a direction providing for the opening of the control port 53.

By virtue of the spring action of the wire member 56 and the connection of the coil spring 66 between the flexible element 61 and the triangular pivot plate 62 it is seen that the valve member 47 is movable to a predetermined stop position, as determined by the setting of the lever 81, in response to the movement of the actuating lever 73 to a position bearing against the handle bar 76. In other words on engagement of the valve member 47 with the stop 86 the wire 56 and spring 66 function as a yieldable lost motion connection relative to further actuation of the valve member 47 by the actuator lever 73.

To provide for a free flow of material through the hopper opening 34 and into the valve mechanism 18 for discharge from the control opening 53 the spreader includes an agitating mechanism indicated generally at 90 (FIG. 2) which includes a wire agitating member 91 of an angulate shape. As best appears in FIGS. 5 and 6 the wire member 91 has a linear section 92 and a section 93 inclined relative to and from one end of the linear section 92. A bracket 94 secured to and projected forwardly from the frame unit 15 rotatably supports the opposite end 96 of the linear section 92 and from such end the section 92 extends forwardly in a parallel relation with the hopper bottom wall 32 and into the valve mechanism 18 with its end 96 rotatably supported in the transverse brace member 52. With the linear section 92 thus arranged the inclined section 93 of the agitating member 91 is projected upwardly through the discharge opening 34 and into the material indicated at 97 located in the hopper 31 about the opening 34. On oscillation of the member 91 about the longitudinal axis of its linear section 92 the inclined section 93 is oscillated back and forth transversely of the discharge opening 34.

A rock arm 98 extended from the linear section 92 at its end 96 is pivotally connected at 99 to one end of an angulate crank member 101, the opposite end 102 of which is eccentrically mounted on a cap or hub member 103 for the traction wheel 16. It is seen therefore that the traction wheel 16 is in a driving relation with both the agitating mechanism 90 and the spreader disc 19.

As best appears in FIG. 6 the control port 53 is arranged directly above the rear portion of the spreader disc 19 so as to drop material thereon at a position intermediate its axis of rotation and the rear end thereof. As a result of this arrangement it has been found that the material from the control port 53 is spread by the disc 19 in a uniform pattern over the path of travel of the spreader.

In a rest or stop position the spreader is supported in an upright position by a pair of leg members 104 (FIG. 3) secured at their front ends by the bolt assembly 26 to the tubular frame member 21 and extends rearwardly therefrom in a diverging relation for engagement of their rear ends 106 with the ground surface. It is seen therefore that the legs 104 and traction wheel 16 constitute a tripod support for the spreader.

For storage purposes the handle 68 is movable from its position shown in FIGS. 1 to 3 to its position shown in FIG. 8. This adjustment of the handle 68 is accomplished by merely removing the lock screw 77 and pivoting the handle 68 downwardly relative to its pivot 71 until the handle bar 76 is adjacent to the rear ends 106 of the legs 104. By virtue of the flexible element 61 being trained over the pivot 71 it is seen that this downward movement of the handle 68 takes place independently of any movement of the control valve 47 by the actuating mechanism 61.

Although the invention has been described with respect to a preferred embodiment thereof it is to be understood that it is not to be so limited since changes can be made therein which are within the full intended scope of the invention as defined by the appended claims.

We claim:
1. A material spreader comprising:
 (a) an upright frame member,
 (b) a traction wheel rotatably supported at the lower end of said frame member,
 (c) a pair of leg members connected at one of the ends thereof to said frame member and relatively diverged rearwardly and downwardly from said frame member to form with said traction wheel a tripod support for holding said spreader in a rest position,
 (d) an upright hopper support including a pair of side members secured to opposite sides of said frame member,
 (e) means securing the lower portions of the rear sections of the side members to the upper portion of said frame member,
 (f) a handle member having an end section positioned between the upper sections of said side members and pivotally connected thereto for pivotal movement of the handle member to an operating position extended upwardly and rearwardly to a storage position extended downwardly and rearwardly between said pair of leg members,
 (g) an upright hopper secured to said support having a bottom wall with a discharge opening therein,
 (h) a spreader disc located below said opening and rotatably supported on said frame member in driven engagement with said traction wheel, and
 (i) a valve mechanism supported on the lower side of said bottom wall for controlling the rate of flow of material from said opening to said spreader disc.

2. A material spreader comprising:
 (a) an upright frame unit,
 (b) a traction wheel rotatably supported at the lower end of said frame unit,
 (c) an elongated handle member,
 (d) pivot means connecting one end of said handle adjacent the upper end of said frame unit for pivotal movement to an operating position extended upwardly and rearwardly from said frame member to a storage position extended downwardly and rearwardly from said frame member,
 (e) leg means connected to and extended rearwardly from the lower section of said frame member in a diverging relation to form a ground engaging tripod support with said traction wheel,
 (f) a material hopper secured to the upper section of said frame unit and extended forwardly therefrom over said traction wheel, said hopper having a bottom wall with a material discharge opening therein,
 (g) a spreader disc located below and opening and rotatably supported on said frame unit for rotation about an upright axis,
 (h) means connecting said spreader disc in a driven relation with said traction wheel,
 (i) a valve mechanism supported on the lower side of said bottom wall, for controlling the flow of material from said opening to said disc,
 (j) means for operating said valve mechanism including an actuator member mounted on said handle member, and
 (k) means connected to said valve mechanism and actuator member including a flexible member trained over the pivot means for said handle whereby said handle member is movable to said two positions therefor without effecting actuation of said operating means.

3. A material spreader comprising:
 (a) a portable frame,
 (b) a traction wheel rotatably supported on said frame,
 (c) a spreader disc driven from said traction wheel and rotatably supported on said frame for rotation about an upright axis,
 (d) a material hopper mounted on said frame having a bottom wall with a discharge opening therein located above said spreader disc,
 (e) an agitating member for agitating that portion of the material within the hopper located about said opening having a first section extended parallel to said bottom wall and spaced below the lower side thereof and a second section inclined relative to said first section and projected upwardly through said opening and into said hopper,
 (f) means supporting said agitating member on said frame for oscillating movement about the longitudinal axis of said first section,
 (g) means connected to said first section and to said traction wheel to oscillate said agitating member in response to rotation of said traction wheel, and
 (h) a valve mechanism supported from said bottom wall to control the rate of flow of material from said discharge opening to said spreader disc.

4. A material spreader comprising:
 (a) a portable frame having a traction wheel,
 (b) a material hopper mounted on said frame having a bottom wall with a discharge opening therein,
 (c) a spreader disc located below said opening and rotatably supported on said frame for rotation about an upright axis,
 (d) means driven from said traction wheel for rotating said disc,
 (e) a valve mechanism for controlling the rate of flow through said opening having a flat elongated valve member with a pair of transversely spaced guide legs laterally extended in one direction from a side thereof, said valve member formed with a control opening therein,
 (f) means guidably supporting said valve member for movement of the control opening into and out of full registration with said discharge opening including a pair of spaced parallel guideways slidably engageable with said legs and coacting with said legs to hold said body member in a spaced parallel relation relative to said bottom wall,
 (g) means for agitating that portion of the material in the hopper located about said opening including an elongated agitating member having a first linear portion and a second portion inclined relative to said first portion,
 (h) means pivotaly mounting said first portion on the frame for oscillating movement relative to the longitudinal axis of said first portion, said first portion from said pivot means being projected between the valve member and said hopper bottom wall to a position wherein the junction of said first and second portions is located below the discharge opening and said second portion is projected through said discharge opening into said hopper, (i) means driven from said traction wheel and connected to said first portion for oscillating said agitating member, and (j) actuating means on said frame for moving said valve member.

5. A material spreader comprising:
(a) a portable frame having a traction wheel,
(b) a material hopper supported on said frame having a bottom wall with a discharge opening therein,
(c) a spreader disc located below said discharge opening and rotatably mounted on said frame for rotation about an upright axis,
(d) means driven from said traction wheel for rotating said disc,
(e) a valve mechanism for controlling the rate of flow of material from said discharge opening to said disc including a valve member having a control port,
(f) means supporting said valve member from the lower side of said bottom wall for reciprocal linear movement,
(g) means for reciprocally moving said valve member including a wire member connected at one end to said valve member and at the opposite end thereof to said frame, the portion of said wire member between the ends thereof being bowed to apply a continuous biasing force in one direction on said valve member, and
(h) means for moving said valve member in an opposite direction including an actuating member mounted on said frame and connected with the bowed portion of the wire member to increase the curvature of the bow therein.

References Cited by the Examiner
UNITED STATES PATENTS

| | | | |
|---|---|---|---|
| 251,332 | 12/1881 | Zimmerman | 275—12 |
| 390,292 | 10/1888 | Gore | 275—15 |
| 2,535,414 | 12/1950 | Heidger | 275—8 |
| 2,973,884 | 3/1961 | Peoples et al. | 222—177 |
| 2,992,008 | 7/1961 | Speicher | 275—12 |
| 3,100,645 | 8/1963 | Mascaro | 275—15 X |

ABRAHAM G. STONE, *Primary Examiner.*

J. R. OAKS, *Assistant Examiner.*